(12) United States Patent
Arai et al.

(10) Patent No.: US 9,871,950 B2
(45) Date of Patent: Jan. 16, 2018

(54) IMAGE FORMING APPARATUS AND IMAGE FORMING METHOD

(71) Applicant: CANON KABUSHIKI KAISHA, Tokyo (JP)

(72) Inventors: Kimitaka Arai, Yokohama (JP); Hideki Kubo, Kawasaki (JP)

(73) Assignee: Canon Kabuhshiki Kaisha, Tokyo (JP)

( * ) Notice: Subject to any disclaimer, the term of this patent is extended or adjusted under 35 U.S.C. 154(b) by 0 days.

(21) Appl. No.: 15/075,404

(22) Filed: Mar. 21, 2016

(65) Prior Publication Data
US 2016/0279922 A1   Sep. 29, 2016

(30) Foreign Application Priority Data

Mar. 26, 2015   (JP) ................. 2015-064473

(51) Int. Cl.
| | |
|---|---|
| *G06K 9/00* | (2006.01) |
| *H04N 1/50* | (2006.01) |
| *H04N 1/54* | (2006.01) |
| *B41J 2/21* | (2006.01) |
| *B41M 3/00* | (2006.01) |
| *B41M 3/06* | (2006.01) |

(52) U.S. Cl.
CPC .............. *H04N 1/50* (2013.01); *B41J 2/2114* (2013.01); *H04N 1/54* (2013.01); *B41M 3/003* (2013.01); *B41M 3/06* (2013.01)

(58) Field of Classification Search
None
See application file for complete search history.

(56) References Cited

U.S. PATENT DOCUMENTS

| | | | |
|---|---|---|---|
| 5,987,166 A | 11/1999 | Hayashi et al. | |
| 6,324,419 B1 * | 11/2001 | Guzelsu ............... | A61B 5/0059 600/473 |
| 6,373,573 B1 * | 4/2002 | Jung ................... | A61B 5/0075 347/19 |
| 6,476,793 B1 * | 11/2002 | Motoyama ............ | H04N 1/62 345/589 |

(Continued)

FOREIGN PATENT DOCUMENTS

JP   2011061723 A   3/2011

OTHER PUBLICATIONS

U. Klank, D. Carton and M. Beetz, "Transparent object detection and reconstruction on a mobile platform," 2011 IEEE International Conference on Robotics and Automation, Shanghai, 2011, pp. 5971-5978.*

(Continued)

*Primary Examiner* — Andrae S Allison
(74) *Attorney, Agent, or Firm* — Fitzpatrick, Cella, Harper & Scinto

(57) ABSTRACT

Provided is an image forming apparatus that forms a layer of at least one type of scattering material. The image forming apparatus is configured to obtain subsurface scattering characteristic data indicating the subsurface scattering characteristic of a reproducing target, and determine the laminated structure of the layer of the scattering material based on the subsurface scattering characteristic data. The image forming apparatus is configured to then form an image corresponding to the layer of the scattering material based on the determined laminated structure of the layer of the scattering material.

20 Claims, 21 Drawing Sheets

(56) References Cited

U.S. PATENT DOCUMENTS

| | | | |
|---|---|---|---|
| 7,339,700 B2* | 3/2008 | Ohga | H04N 1/6011 345/581 |
| 8,014,599 B2 | 9/2011 | Ohga et al. | |
| 8,562,546 B2* | 10/2013 | Shih | A61B 5/0053 310/321 |
| 8,570,517 B2 | 10/2013 | Horita | |
| 9,109,955 B2 | 8/2015 | Horita | |
| 2003/0139667 A1* | 7/2003 | Hewko | A61B 5/0059 600/410 |
| 2006/0239547 A1* | 10/2006 | Robinson | A61B 5/0059 382/162 |
| 2011/0063618 A1* | 3/2011 | Horita | G01J 3/46 356/402 |
| 2014/0022550 A1 | 1/2014 | Horita | |

OTHER PUBLICATIONS

Bersha, K. S., Spectral imaging and analysis of human skin (PhD Thesis), University of Eastern Finland, (2010).*

* cited by examiner

| HALF WIDTH IN AMOUNT OF LIGHT | AMOUNT OF CLEAR INK |
|---|---|
| XXX | XXX |
| XXX | XXX |
| ... | ... |
| XXX | XXX |

FIG.6

| AMOUNT OF SCATTERING MATERIAL | AMOUNT OF LIGHT AT CENTER OF OPTICAL AXIS |
|---|---|
| XXX | XXX |
| XXX | XXX |
| XXX | XXX |
| ⋮ | ⋮ |
| XXX | XXX |
| XXX | XXX |

FIG.9

| Lab | | | AMOUNTS OF COLOR INKS | | | |
| --- | --- | --- | --- | --- | --- | --- |
| L | a | b | C | M | Y | k |
| XXX | XXX | XXX | XXX | XXX | XXX | XXX |
| XXX | XXX | XXX | XXX | XXX | XXX | XXX |
| XXX | XXX | XXX | XXX | XXX | XXX | XXX |
| ... | ... | ... | ... | ... | ... | ... |
| XXX | XXX | XXX | XXX | XXX | XXX | XXX |
| XXX | XXX | XXX | XXX | XXX | XXX | XXX |
| ... | ... | ... | ... | ... | ... | ... |
| XXX | XXX | XXX | XXX | XXX | XXX | XXX |
| XXX | XXX | XXX | XXX | XXX | XXX | XXX |
| ... | ... | ... | ... | ... | ... | ... |
| XXX | XXX | XXX | XXX | XXX | XXX | XXX |
| XXX | XXX | XXX | XXX | XXX | XXX | XXX |

| SUBSURFACE SCATTERING INFORMATION | DISTANCE FROM CENTER OF OPTICAL AXIS | AMOUNT OF LIGHT |
|---|---|---|
| HAZE VALUE XXX | XXX | XXX |
| | XXX | XXX |
| | XXX | XXX |
| HAZE VALUE XXX | XXX | XXX |
| | XXX | XXX |
| | XXX | XXX |

FIG.21

IMAGE FORMING APPARATUS AND IMAGE FORMING METHOD

BACKGROUND OF THE INVENTION

Field of the Invention

The present invention relates to a technique of reproducing a translucent body.

Description of the Related Art

There have been demands for reproduction of translucent bodies in printing of product packages, outdoor advertisements, and decorative building materials. Human skin, marble, milk, and the like are known examples of these translucent bodies. The appearance of such a translucent body is determined by a characteristic in which light passes through the front surface of the translucent body, repeats reflection and scattering inside a number of times, and exits from the front or back surface of the translucent body (hereinafter, referred to as the subsurface scattering characteristic).

A technique described for example in Japanese Patent Laid-Open No. 2011-61723 is one technique of managing the appearance of a translucent body as mentioned above. Japanese Patent Laid-Open No. 2011-61723 discloses a method that involves obtaining spectral radiance from a print product in an environment where both a transmissive light source and a reflective light source are present, and calculating colorimetric values in a desired observational environment based on the spectral radiance.

In the case of reproducing the appearance of a translucent body by using the method described in Japanese Patent Laid-Open No. 2011-61723, it is possible to macroscopically reproduce the spectral reflection characteristic of the translucent body by designating an observational environment for color management and using values measured from a print product of the translucent body in the observational environment. However, it is impossible to reproduce such appearance as subsurface scattering in the translucent body in which the amount of light decreases in accordance with the distance from the position of incidence of light.

SUMMARY OF THE INVENTION

An image forming apparatus according to the present invention is an image forming apparatus that forms a layer of at least one type of scattering material, including: an obtaining unit configured to obtain subsurface scattering characteristic data indicating a subsurface scattering characteristic of a reproducing target; a determination unit configured to determine a laminated structure of the layer of the scattering material based on the subsurface scattering characteristic data; and a formation unit configured to form an image corresponding to the layer of the scattering material based on the determined laminated structure of the layer of the scattering material.

Further features of the present invention will become apparent from the following description of exemplary embodiments (with reference to the attached drawings).

BRIEF DESCRIPTION OF THE DRAWINGS

FIG. 6 is a schematic diagram of a LUT showing the correlations between half widths in amount of light and amounts of clear ink according to Embodiment 1;

FIG. 9 is a schematic diagram of a LUT showing the correlations between amounts of a scattering material and light amount data according to Embodiment 2;

FIG. 18 is a schematic diagram of LUTs showing the correlations between Lab values and amounts of color materials according to Embodiment 5;

FIG. 21 is a diagram for describing the correlation between subsurface scattering information and light scattering characteristic data according to Embodiment 6.

DESCRIPTION OF THE EMBODIMENTS

Figure 1A:
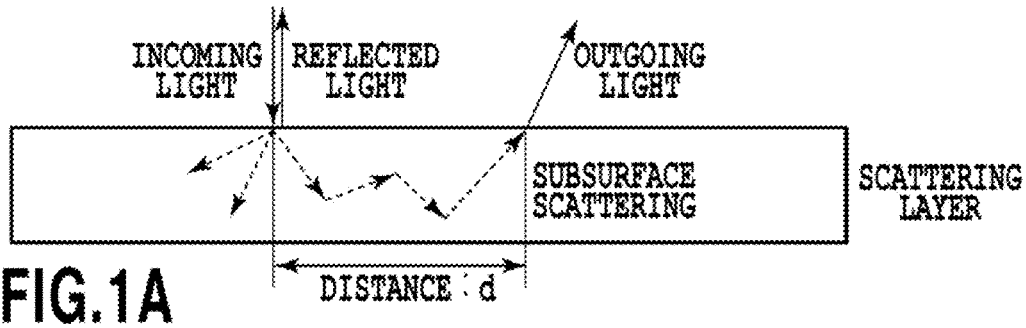
FIGS. 1A to 1D are diagrams for describing how subsurface scattering occurs in a translucent body.

Before describing embodiments, subsurface scattering will be described. As mentioned earlier, subsurface scattering is the decrease in the amount of light in accordance with the distance from the position of incidence of light. The following will describe the idea of subsurface scattering by using schematic diagrams in FIGS. 1A to 1D. FIG. 1A is a diagram schematically showing a cross section of a scattering layer as a translucent body. After being emitted in the vertical direction and passing the surface of the scattering layer, light repeats reflection and scattering and exits from a point which is a distance d away.

Figure 1B:
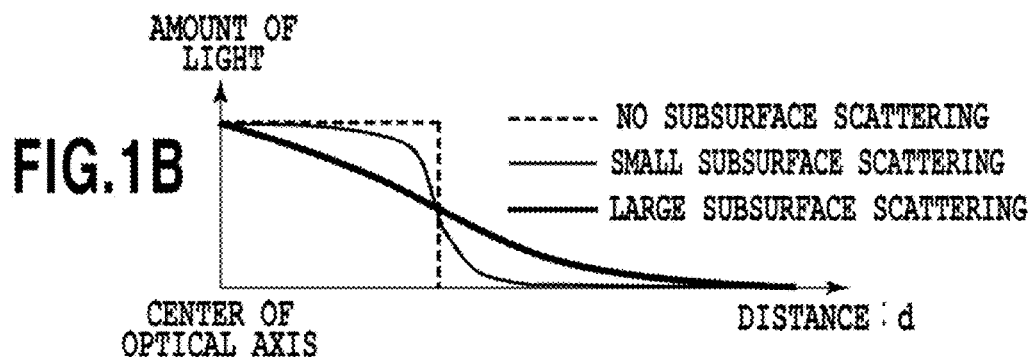

Here, the subsurface scattering characteristic (also referred to as the amount of light scattering) can be expressed as shown in FIG. 1B by the distance from the center of the optical axis along which light is emitted and the intensity of the exiting light. In the graph in FIG. 1B, the vertical axis represents the intensity of light while the horizontal axis represents the distance from the center of the optical axis along which the light is emitted. Also, in the graph, the dotted line schematically shows the light diffusion characteristic in a case where the subsurface scattering causes no light scattering, the solid line schematically shows the light diffusion characteristic in a case where the subsurface scattering causes a small amount of light scattering, and the bold line schematically shows the light diffusion characteristic in a case where the subsurface scattering causes a large amount of light scattering.

Figure 1C:
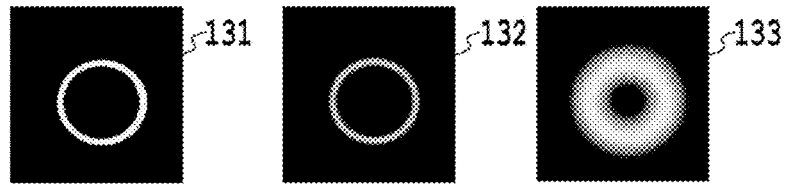

FIG. 1C is a diagram showing images obtained by emitting annular light onto translucent bodies which respectively have the subsurface scattering characteristics shown in FIG. 1B and capturing their reflected images. An image 131 corresponds to the reflected image obtained by emitting the light onto the translucent body having the subsurface scattering characteristic shown by the dotted line in FIG. 1B (i.e. a body having no subsurface scattering characteristic). An image 132 corresponds to the reflected image obtained by emitting the light onto the translucent body having the subsurface scattering characteristic shown by the solid line in FIG. 1B (i.e. a body having a small subsurface scattering characteristic). An image 133 corresponds to the reflected image obtained by emitting the light onto the translucent body having the subsurface scattering characteristic shown by the bold line (i.e. a body having a large subsurface scattering characteristic). In the case of the translucent body with no subsurface scattering, the shape of the annular light is not blurred in the reflected image, like the image 131. On the other hand, the shape of the annular light is blurred in the image 132 of the translucent body having some subsurface scattering characteristic. The shape of the annular light is greatly blurred in the image 133 of the translucent body having a larger subsurface scattering characteristic.

In each embodiment to be described below, information that indicates a subsurface scattering characteristic as shown in FIG. 1B is obtained in advance from a reproducing-target translucent body. Then, by inputting the subsurface scattering information on the reproducing target, it is possible to reproduce a translucent body having a desired subsurface scattering characteristic as shown in FIG. 1C.

Figure 1D:
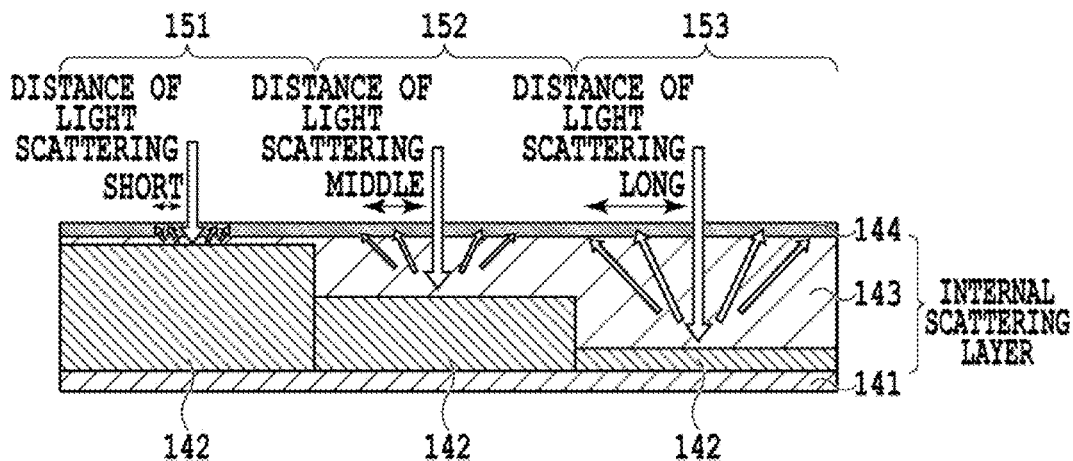

In each embodiment to be described below, scattering materials differing from each other in transmittance are used. FIG. 1D is a diagram schematically showing an example of a cross section for describing layers formed to reproduce a translucent body. As shown in FIG. 1D, the translucent body is reproduced by forming a layer of at least one of scattering material. For example, in the translucent body, a reflective layer 142 made of white ink is provided on a transparent base material (such as a film) 141. A transmissive layer 143 made of clear ink is then formed on the reflective layer 142. These two types of layers, namely, the reflective layer 142 and the transmissive layer 143 function as an internal scattering layer. A CMYK image layer 144 is then formed on the surface. Note that a region 151, a region 152, and a region 153 in FIG. 1D correspond to the subsurface scattering characteristics of the image 131, the image 132, and the image 133 in FIG. 1C, respectively. In other words, the larger the amount of the clear ink (the thickness of the transmissive layer), the larger the distance to the reflective layer 142 and therefore the larger the distance of light scattering as shown in FIG. 1D, thereby making the reflected image blurred.

As in the above case, in each embodiment to be described below, clear ink as an example of a scattering material having a relatively low scattering characteristic and white ink as an example of a scattering material having a relatively high scattering characteristic will be exemplarily described as the scattering materials differing from each other in transmittance. It is, however, needless to say that the scattering materials are not limited to these and various other scattering materials can be used.

Also, a laminated structure to be mentioned in each embodiment covers the number of laminations of a scattering material, the amount of the scattering material, and the spatial (two- and three-dimensional) distributions of the scattering material.

Embodiment 1

In this embodiment, description will be given of an example where a reproducing-target translucent body is reproduced in the form of a print product based on subsurface scattering information on the translucent body.

Figure 2:
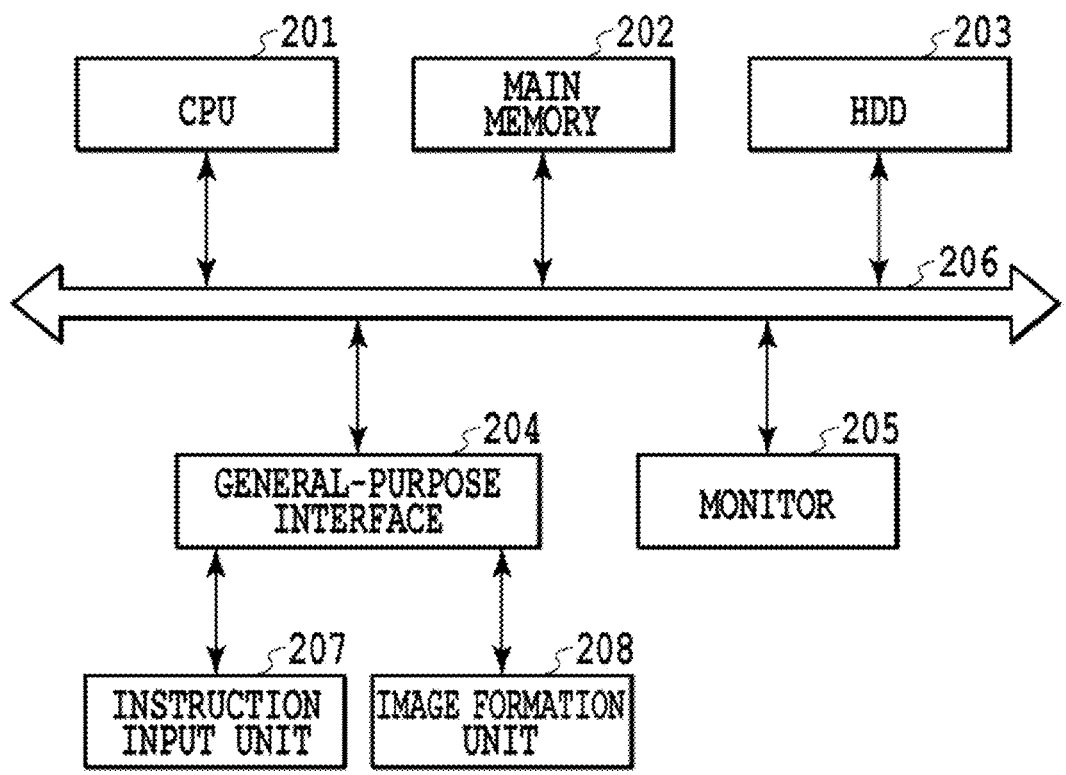
FIG. 2 is a block diagram showing the configuration of an image forming apparatus according to an embodiment.

FIG. 2 is a diagram of the configuration of an image forming apparatus in this embodiment. The image forming apparatus includes a CPU 201, a main memory 202, a HDD 203, a general-purpose interface 204, a monitor 205, a main bus 206, an instruction input unit 207 such as a keyboard and a mouse, and an image formation unit 208. The general-purpose interface 204 connects the instruction input unit 207, the image formation unit 208, and other relevant elements to the main bus 206.

The following will discuss various processes which are implemented by the CPU 201 running various kinds of software (computer programs) stored in the HDD 203. First, the CPU 201 starts an image processing application stored in the HDD 203 in response to an instruction given by the user by means of the instruction input unit 207. The CPU 201 then deploys the image processing application on the main memory 202 and displays a user interface on the monitor 205. Thereafter, based on an instruction from the CPU 201, various pieces of data stored in the HDD 203 are transferred to the main memory 202 via the main bus 206. Based on an instruction from the CPU 201, the various pieces of data transferred to the main memory 202 are subjected to predetermined arithmetic processing. The result of the arithmetic processing is displayed on the monitor 205 via the main bus 206 or stored in the HDD 203. Description will now be given of processes which the image processing application performs with the above configuration based on instructions from the CPU 201.

Figure 3:
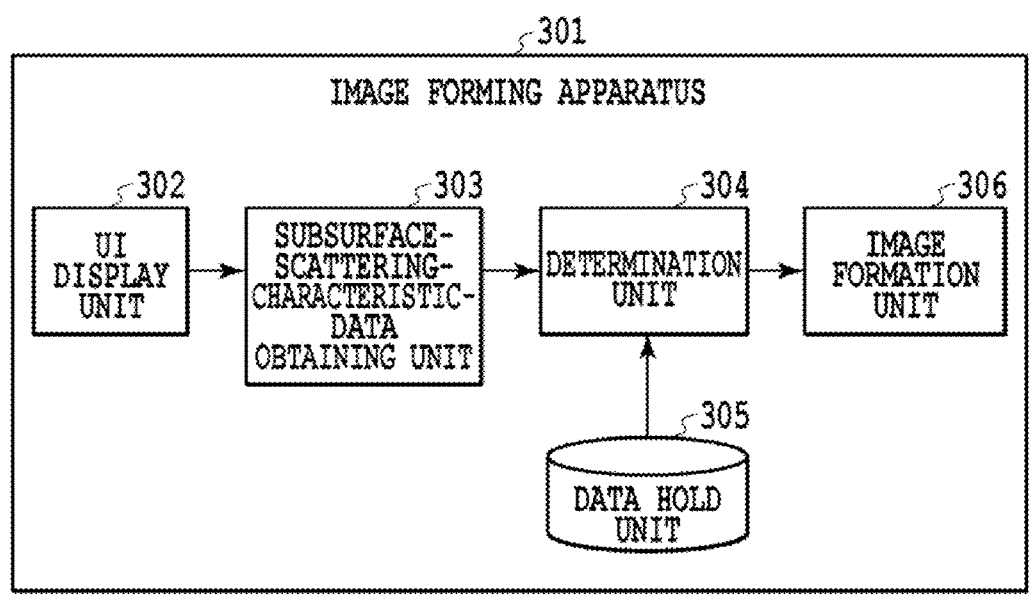
FIG. 3 is a block diagram showing the logical configuration of the image forming apparatus according to the embodiment.

FIG. 3 is a diagram showing the logical configuration of an image forming apparatus 301 in this embodiment. In FIG. 3, the image forming apparatus 301 includes a UI display unit 302, a subsurface scattering characteristic-data obtaining unit 303, a determination unit 304, a data hold unit 305, and an image formation unit 306.

The UI display unit 302 is configured to display the user interface and the like on the monitor 205. The subsurface scattering characteristic-data obtaining unit 303 is configured to obtain subsurface scattering characteristic data on a reproducing target designated by the user. The subsurface scattering characteristic data is data indicating the subsurface scattering characteristic of the reproducing target. For example, it is data indicating a subsurface scattering characteristic as shown in FIG. 1B. Details will be described later.

The determination unit 304 is configured to determine the laminated structure of a scattering material for reproducing the subsurface scattering characteristic of the reproducing target based on the subsurface scattering characteristic data, which is obtained by the subsurface-scattering-characteristic-data obtaining unit 303, and data held in the data hold unit 305. Specifically, the determination unit 304 determines the amount (thickness) of clear ink for reproducing the subsurface scattering characteristic of the reproducing target. The data hold unit 305 in this embodiment is configured to hold data in which various subsurface scattering characteristics and thicknesses of the scattering material (e.g. amounts of clear ink) are associated with each other. The determination unit 304 determines the thickness of the scattering material (the amount of clear ink) corresponding to the obtained subsurface scattering characteristic data based on the data held in the data hold unit 305.

The image formation unit 306 is configured to form an image based on the thickness of the scattering material (the amount of clear ink) determined by the determination unit 304.

<Operation of Image Forming Apparatus 301>

Figure 4:
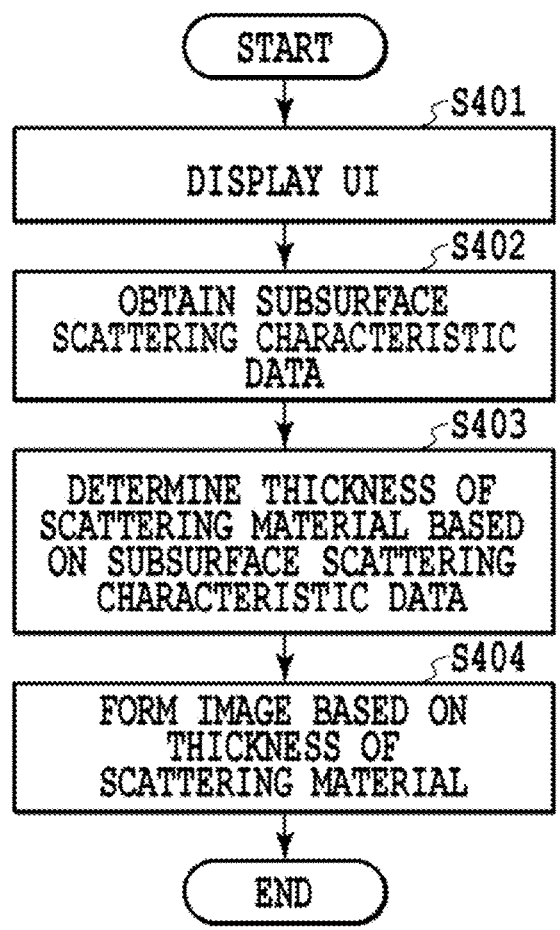
FIG. 4 is a flowchart of an image forming process according to Embodiment 1.

FIG. 4 is a flowchart of a process performed by the image forming apparatus 301. In Step S401, the UI display unit 302 displays the user interface for receiving input of necessary information for performing image processing from the user.

Figures 5A, 5B, 5C:
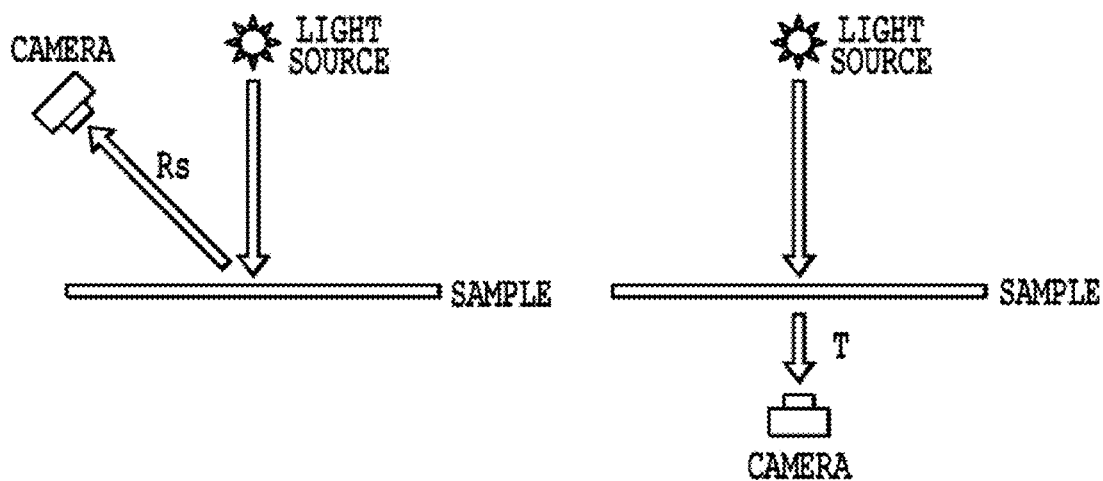
FIGS. 5A to 5C are diagrams for describing subsurface scattering characteristic data according to Embodiment 1.

In Step S402, the subsurface-scattering characteristic-data obtaining unit 303 obtains subsurface scattering characteristic data on a reproducing target which is inputted by the user through the UI displayed in Step S401. Here, as the subsurface scattering characteristics indicated by the subsurface scattering characteristic data, the amounts of light scattering shown in FIG. 1B are used. As shown in FIG. 1B, each subsurface scattering characteristic can be specified by distances from the center of the light source and the amounts of light at those distances. Then, the subsurface scattering characteristic data can be data in which distances from the center of the light source plotted at given intervals and the amounts of light at those distances are associated with each other. An example of the subsurface scattering characteristic data is shown in FIG. 5A. In this embodiment, data in which, as shown in FIG. 5A, distances from the center of the optical axis and the amounts of light (luminance values) at those distances are associated with each other is used. Note that the subsurface scattering characteristic data does not necessarily have to be data as shown in FIG. 5A. If subsurface scattering characteristics as shown in FIG. 1B can be expressed with functions, the subsurface scattering characteristic data may be data representing those functions. Alternatively, the subsurface scattering characteristic data may be a parameter that specifies subsurface scattering characteristics among various subsurface scattering characteristics converted into a database in advance. In any case, the subsurface scattering characteristic data only needs to be data capable of specifying subsurface scattering characteristics as shown in FIG. 1B.

Note that this embodiment will be described under the assumption that the subsurface scattering characteristic of the reproducing target stays constant for the sake of simple description. However, the reproducing-target translucent body may include regions having mutually different subsurface scattering characteristics. In that case, the subsurface scattering characteristic data is data in which each region of the reproducing-target translucent body and the subsurface scattering characteristic of that region are associated with each other. Here, each unit region of the translucent body to be processed may be designated on a pixel-by-pixel basis or designated on a block-by-block basis with one block being formed of a certain number of pixels, for example.

Note that each distance from the center of the light source and the amount of light (i.e. the amount of light scattering) at that distance as shown in FIG. 5A can be obtained as shown in FIG. 5B, for example. Specifically, the distance and the amount of light can be obtained by emitting light at an angle of 90 degrees on the front side of the reproducing target and capturing an image of reflected light Rs traveling in a 45-degree direction on the front side with an image input device such as a digital camera. The reflected light Rs is light formed of surface reflected light that is reflected on the surface of the reproducing target and internally reflected light that is reflected inside the reproducing target. The image needs to be captured carefully such that an image of light passing through the reproducing target and reflected on a different object is captured along with the reflected light Rs. As shown in FIG. 1C, in the case where there is no amount of light scattering, an image like the image 131 is obtained in which the light spot of the light source appears clearly. On the other hand, in the case where the amount of light scattering is large, an image like the image 133 is obtained in which the light spot of the light source appears blurred.

Alternatively, as shown in FIG. 5C, the amount of light scattering in the reproducing target may be obtained by capturing an image of transmitted light T emitted at an angle of 90 degrees on the back side of the reproducing target and traveling in a 90-degree direction on the front side, with an image input device such as a digital camera.

Meanwhile, in the measurement in either of FIGS. 5B and 5C, it is preferable that the flux of light illuminating the sample be substantially parallel light with a less than 3-degree misalignment from the optical axis. It is needless to say that the geometric condition described in this embodiment is an example and the amount of light scattering may be obtained under a different geometric condition.

In Step S403, the determination unit 304 determines the thickness of the scattering material (the amount of clear ink) based on the subsurface scattering characteristic data on the reproducing target, which is obtained in Step S402. For example, the determination unit 304 firstly calculates the half width in amount of light of the reproducing target from the subsurface scattering characteristic data on the reproducing target, which is obtained in Step S402. The half width in amount of light is an index indicating the degree of spread of a bell-shaped function as shown in FIG. 1B, for example. The method of calculating the half width is publicly known, and description thereof will therefore be omitted here. The determination unit 304 then determines the thickness of the scattering material (the amount of clear ink) based on the calculated half width in amount of light and the data held in the data hold unit 305.

The data hold unit 305 holds data as shown for example in FIG. 6 in which half widths in amount of light and amounts of clear ink corresponding to those half widths in amount of light are associated with each other. The data shown in FIG. 6 is data obtained by associating amounts of clear ink with half widths in amount of light calculated from an image of a translucent body with the amount of its clear ink varied (with the amount of its scattering layer varied) in advance as shown in FIG. 1D captured by using a method as shown in FIG. 5B or 5C, for example. As shown in FIGS. 1C and 1D, the larger the amount of clear ink (the larger the thickness of the transmissive layer), the larger the distance of light scattering from the center of the optical axis. On the other hand, the smaller the amount of clear ink (the smaller the thickness of the transmissive layer), the smaller the distance of light scattering. The data hold unit 305 holds data containing such characteristics.

The determination unit 304 determines the half width in amount of light in the data hold unit 305 that matches the half width in amount of light corresponding to the subsurface scattering characteristic of the reproducing target, which is obtained in Step S402. The determination unit 304 then determines the amount of clear ink associated with the determined half width in amount of light as the amount of clear ink to be used for the printing of the reproducing target. If none of the half widths in amount of light is matched, a corresponding amount of clear ink may be calculated by performing interpolation operation or the like. The determined amount of clear ink is stored in the main memory 202.

The determination unit 304 performs the above process for each predetermined unit region of the reproducing target to be processed and determines the amount of clear ink for each unit region to be processed.

Figure 7:
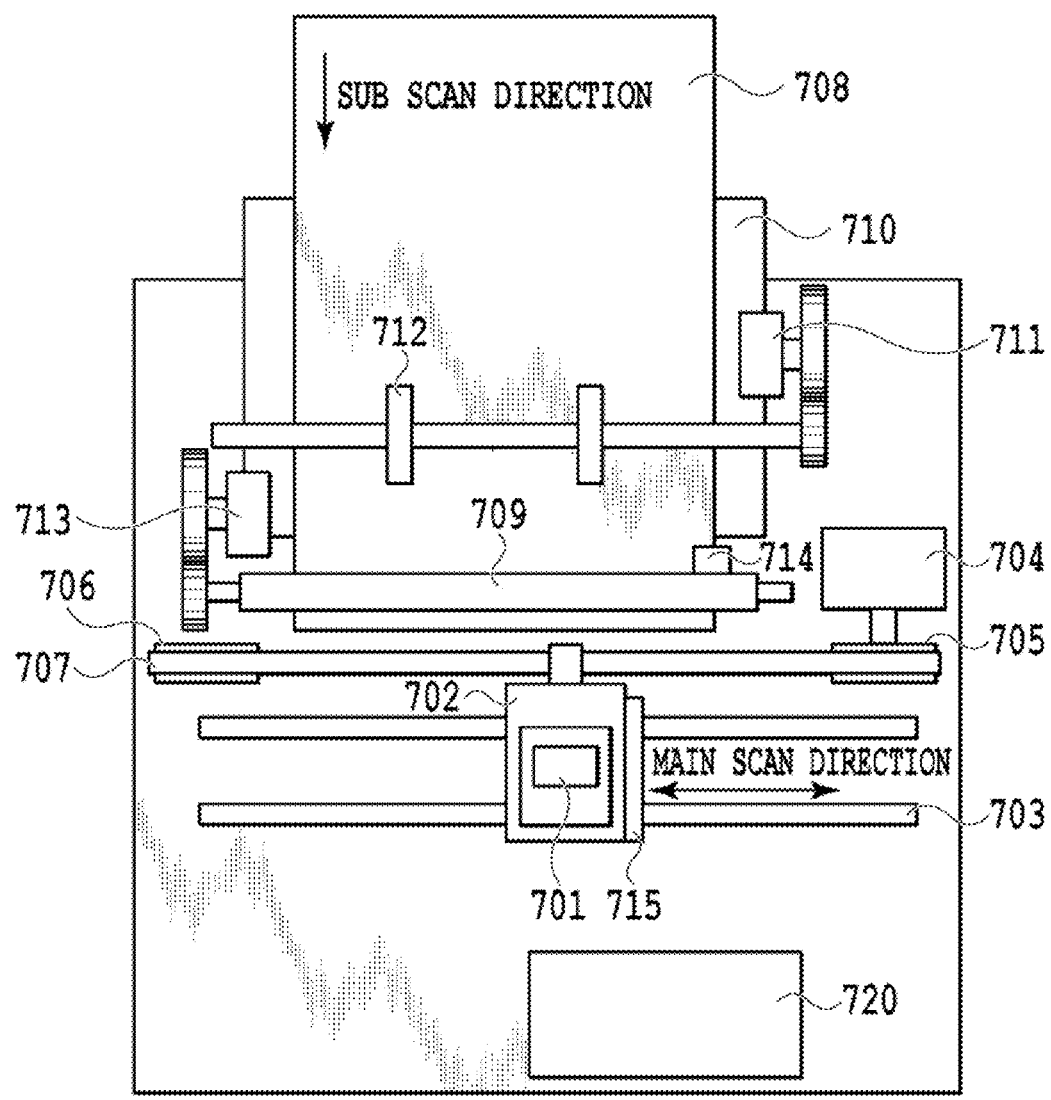
FIG. 7 is a diagram showing the configuration of an image formation unit according to the embodiment.

In Step S404, the image formation unit 306 forms an image on a transparent record medium (e.g. film) based on the thickness of the scattering material determined in Step S403. By this step, the process ends. FIG. 7 is a diagram of the configuration of the image formation unit 306. A head cartridge 701 includes a record head formed of a plurality of ejection ports and ink tanks for feeding inks to this record head. The head cartridge 701 is also provided with a connector for receiving signals for driving the ejection ports of the record head and the like. Six different ink tanks in total are provided independently of each other for clear ink for forming the transparent layer, white ink for controlling the scattering characteristic, and cyan (C), magenta (M), yellow (Y), and black (K) inks for controlling colors. The head cartridge 701 is positioned on and replaceably mounted on a carriage 702. The carriage 702 is provided with a connector holder for transferring the drive signals and the like to the head cartridge 701 through the connector. The carriage 702 is capable of reciprocating movement along guide shafts 703. Specifically, the carriage 702 is configured to be driven and its position and movement are controlled by a main scan motor 704 as a drive source through a drive mechanism such as a motor pulley 705, a driven pulley 706, and a timing belt 707. Note that the movement of this carriage 702 along the guide shafts 703 will be referred to as "main scan" and the direction of this movement will be referred to as the "main scan direction." Record media 708 such as transparent films for printing are placed on an automatic sheet feeder (hereinafter "ASF") 710. In image formation, pickup rollers 712 are rotated through gears by driving of a sheet feed motor 711, so that the record media 708 are separately fed one by one from the ASF 710. Further, each record medium 708 is conveyed by rotation of a conveyance roller 709 to a record start position at which the record medium 708 faces the ejection-port face of the head cartridge 701 on the carriage 702. The conveyance roller 709 is configured to be driven by a line feed (LF) motor 713 as a driven source through gears. Whether or not the record medium 708 is fed is determined and whether or not the record medium 708 is at a fed period position is confirmed when the record medium 708 passes a paper end sensor 714. The head cartridge 701, which is mounted on the carriage 702, is held such that its ejection-port face projects downward from the carriage 702 and is in parallel to the record medium 708. A control unit 720 is configured to control the operation of each part of the image formation unit 306 based on the thickness of the clear layer determined in Step S403. In this embodiment, the image formation unit 306 will be described as a bi-level printer configured to control whether or not to eject inks at predetermined resolutions, for the sake of simple description. It is of course possible to use a method capable of changing the size of each ink droplet to be ejected.

Image forming operation will be described below. Firstly, when a record medium 708 is conveyed to the predetermined record start position, the carriage 702 is moved over the record medium 708 along the guide shafts 703. While the carriage 702 is moved, inks are ejected from the ejection ports of the record head. After the carriage 702 is moved to one end of the guide shafts 703, the conveyance roller 709 conveys the record medium 708 by a predetermined amount in a direction perpendicular to the scan direction of the carriage 702. This conveyance of the record medium 708 will be referred to as "paper feed" or "sub scan," and the direction of this conveyance will be referred to as the "paper feed direction" or "sub scan direction." After the record medium 708 finishes being conveyed by the predetermined amount, the carriage 702 is moved along the guide shafts 703 again. By repeating the scan of the record head by the carriage 702 and the paper feed as described above, subsurface scattering control layers (transmissive layer and reflective layer) and an image are formed over the record medium 708. Note that the record medium used in this embodiment may be any medium as long as the record head can form images thereon. Also, although the example where the image formation unit uses an inkjet method has been presented in this embodiment, a different recording method may be used instead.

The image formation unit 306 calculates the number of laminations of clear ink from the thickness of the clear layer, which is determined in Step S403. A possible method of the calculation may be using a table in which the correlation between the thickness of the clear layer and the number of laminations is recorded. Alternatively, the calculation can be done by multiplying the thickness of the clear layer by a predetermined coefficient since the number of laminations and the thickness are usually in proportion to each other. Then, the image formation unit 306 forms the clear layer on the record medium based on the calculated number of laminations. To form a layer of a desired thickness, the image formation unit 306 in this embodiment laminates clear ink a plurality of times by repeating the scan by the carriage.

Note that although Step S404 has been described under the assumption that the inputted image and the image formation unit have the same resolution, a resolution conversion process may be performed as appropriate if they have different resolutions. Also, a clear layer, a white ink image, and a CMYK image are all formed at each paper feed, but the formation is not limited to this method. For example, it is possible to firstly form a clear layer over the entire area of the inputted image and return the record medium to the predetermined record start position, and then form a white ink image, return the record medium again to the predetermined record start position, and form a CMYK image.

As described above, in this embodiment, an image is formed based on the thickness of laminated clear ink (the amount of clear ink) corresponding to the subsurface scattering characteristic of the reproducing target based on its subsurface scattering characteristic data. In this way, it is possible to form a print product with the subsurface scattering characteristic controlled. Hence, it is possible to obtain a print product of any translucent body reproducing its appearance.

Embodiment 2

Figure 8:
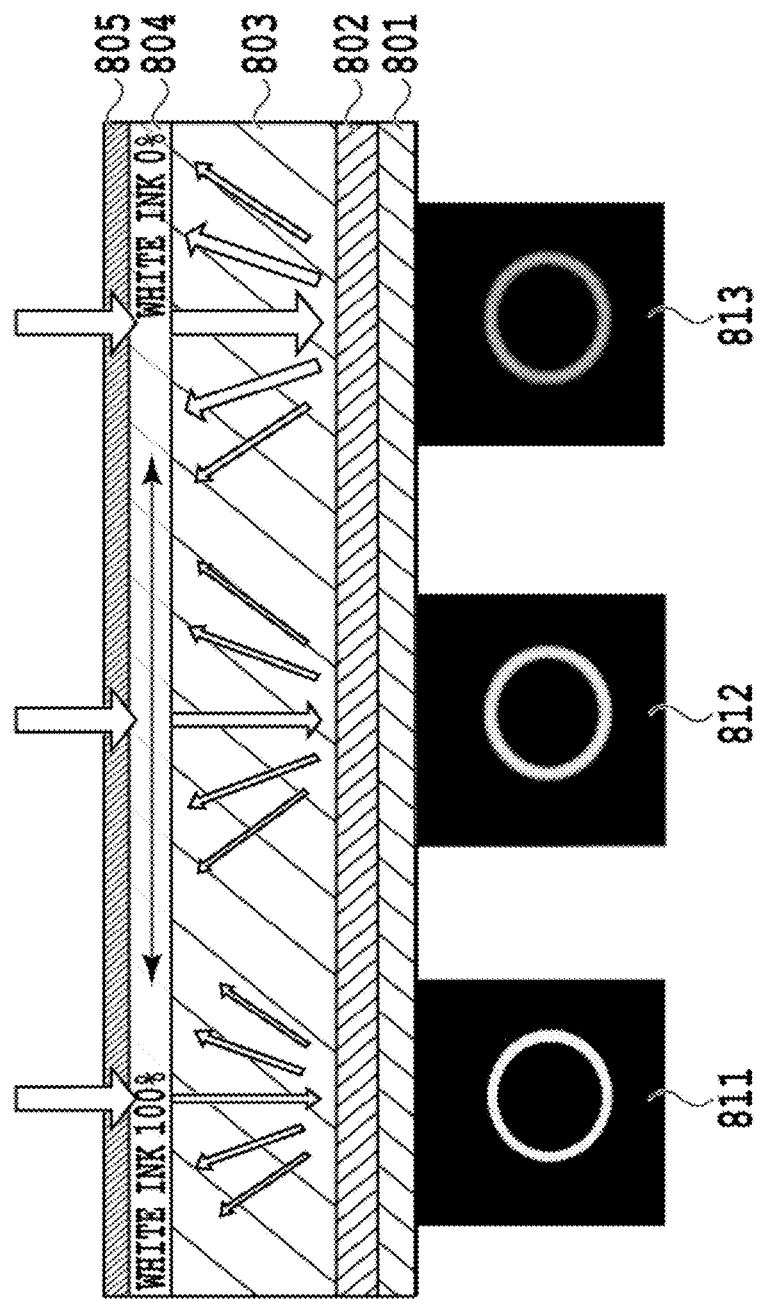
FIG. 8 is a diagram for describing how subsurface scattering occurs in a translucent body.

In Embodiment 1, the description has been given of the example that involves controlling the amount of clear ink as a method of controlling the subsurface scattering characteristic. In this embodiment, description will be given of an example that involves controlling the amount of white ink as the laminated structure of the scattering material to control gain in amount of light in the subsurface scattering characteristic. FIG. 8 is a diagram for describing a summary of Embodiment 2. In a reproducing-target translucent body in Embodiment 2, white ink is formed as a reflective layer 802 on a base material 801 such as a transparent film. A clear ink layer is then formed as a transmissive layer 803 on the white ink layer. A white ink layer 804 is further formed on this transmissive layer 803, and a CMYK image layer 805 on the white ink layer 804. FIG. 8 shows an example where the thickness of the clear ink layer 803 remains constant whereas the amount of white ink (the proportion in area of white ink) at the white ink layer 804 on the clear ink layer 803 is varied. Also, images 811, 812, and 813 are images obtained by capturing reflected images of an annular light spot on the white ink layer 804 where the amount of ink is 100%, 50%, and 0%, respectively. As shown in FIG. 8, even with the amount of clear ink kept constant, increasing the amount of white ink (the amount of the scattering material) in the white ink layer 804 reduces the amount of light scattering and thereby makes a projected image of light clear. On the other hand, reducing the amount of the scattering material increases the amount of light scattering and thereby makes a projected image of light blurred.

In this embodiment, description will be given of an example where this characteristic is utilized to form a reproducing-target translucent body. Note that the configuration in Embodiment 2 is identical to Embodiment 1. The difference from Embodiment 1 is the content of the process by the determination unit 304 and the data held in the data hold unit 305. In the following, this process will be described, and description of the operation in the other processes will be omitted.

As in Embodiment 1, the determination unit 304 in Embodiment 2 is configured to obtain subsurface scattering characteristic data on the reproducing target. Also, the data hold unit 305 is configured to hold data as shown in FIG. 9. FIG. 9 is a LUT in which amounts of the scattering material (amounts of white ink) and amounts of light at the center of the optical axis are associated with each other. The LUT shown in FIG. 9 is data in which the larger the amount of white ink, the larger the amount of light at the center of the optical axis, and the smaller the amount of white ink, the smaller the amount of light at the center of the optical axis. The data shown in FIG. 9 is also assumed as data in which are stored in advance pieces of data obtained by measuring the amount of light with the amount of white ink varied by using the method shown in FIG. 5B or 5C.

The determination unit 304 is configured to determine the amount of light at the center of the optical axis in a unit region to be processed from the obtained subsurface scattering characteristic data. Then, referring to the LUT in FIG. 9, the determination unit 304 determines the amount of the scattering material (the amount of white ink) that matches the determined amount of light at the center of the optical axis. If no data is matched, interpolation operation may be performed. The determination unit 304 determines the amount of white ink for every unit region to be processed and stores them in the main memory 202.

The image formation unit 306 is configured to form an image based on the amounts of white ink in the unit regions to be processed stored in the main memory 202. First, the image formation unit 306 quantizes the amounts of white ink stored in the main memory 202. In the quantization, the amounts of white ink are handled as pieces of information spatially distributed evenly over the inputted image size, in other words, image data containing pixels each having amounts of white ink. The method of the quantization may be a general method such as a dither matrix method or an error diffusion method. Then, the image formation unit 306 forms an image on the clear layer with white ink as shown in FIG. 8 based on the quantized white ink data.

As described above, in Embodiment 2, an image is formed with the amount of white ink calculated from the subsurface scattering characteristic. In this way, it is possible to form a print product with the gain in amount of light in the subsurface scattering controlled. Hence, it is possible to obtain a print product of any translucent body reproducing its appearance.

Embodiment 3

Figure 10:
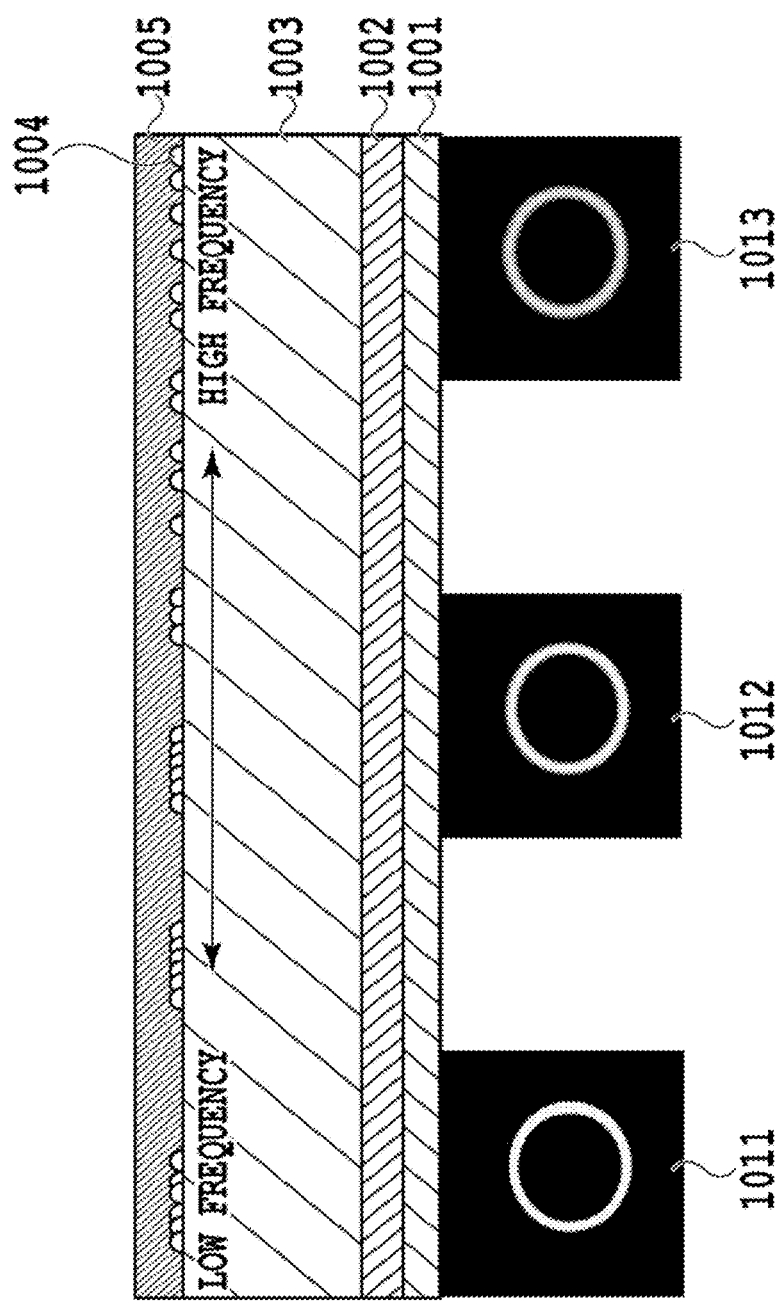
FIG. 10 is a diagram for describing how subsurface scattering occurs in a translucent body.

In Embodiment 2, the description has been given of the example that involves controlling the amount of white ink as a method of controlling the subsurface scattering characteristic. In this embodiment, description will be given of an example that involves controlling the subsurface scattering characteristic based on the amount of white ink and the spatial distribution of white ink as the laminated structure of the scattering material. FIG. 10 is a diagram for describing a summary of Embodiment 3. In Embodiment 3, too, in a reproducing-target translucent body, a reflective layer 1002 is formed with white ink on a base material 1001 such as a transparent film, and a transmissive layer 1003 is formed with clear ink on the reflective layer 1002. Then, a white ink layer 1004 is formed on the transmissive layer 1003, and a CMYK image layer 1005 is formed on the white ink layer 1004. Here, if the spatial distribution of the white ink layer 1004 is different from one region to another, the amounts of light scattering at these regions differ from each other even with the same amount of ink given at the regions. For example, as shown in FIG. 10, in a case where the white ink layer 1004 is distributed at a low frequency, the amount of light scattering is small and thereby a projected image of light is clear. On the other hand, in a case where the white ink layer 1004 is distributed at a high frequency, the amount of light scattering is large and thereby a projected image of light is blurred.

Note that the configuration in Embodiment 3 is identical to Embodiments 1 and 2. The difference from Embodiments 1 and 2 is the configuration of and the content of the process by the determination unit 304 and the content of the data held in the data hold unit 305. In the following, this process will be described, and description of the operation in the other processes will be omitted.

Figure 11:
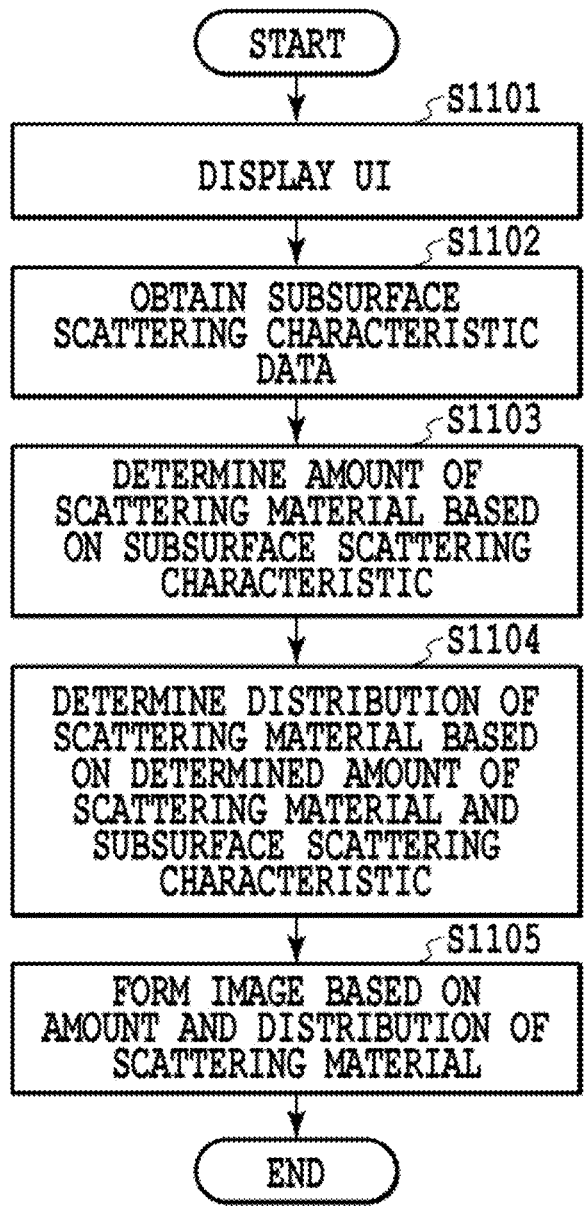
FIG. 11 is a flowchart of image formation according to Embodiment 3.

FIG. 11 is a flowchart of a process performed by the image forming apparatus 301. Steps S1101 and S1102 are the same as Steps S401 and S402.

In Step S1103, the determination unit 304 determines the amount of white ink based on the subsurface scattering characteristic data, which is obtained in Step S1102. This process is similar to the process described in Embodiment 2 and therefore description thereof will be omitted here.

Figure 12:
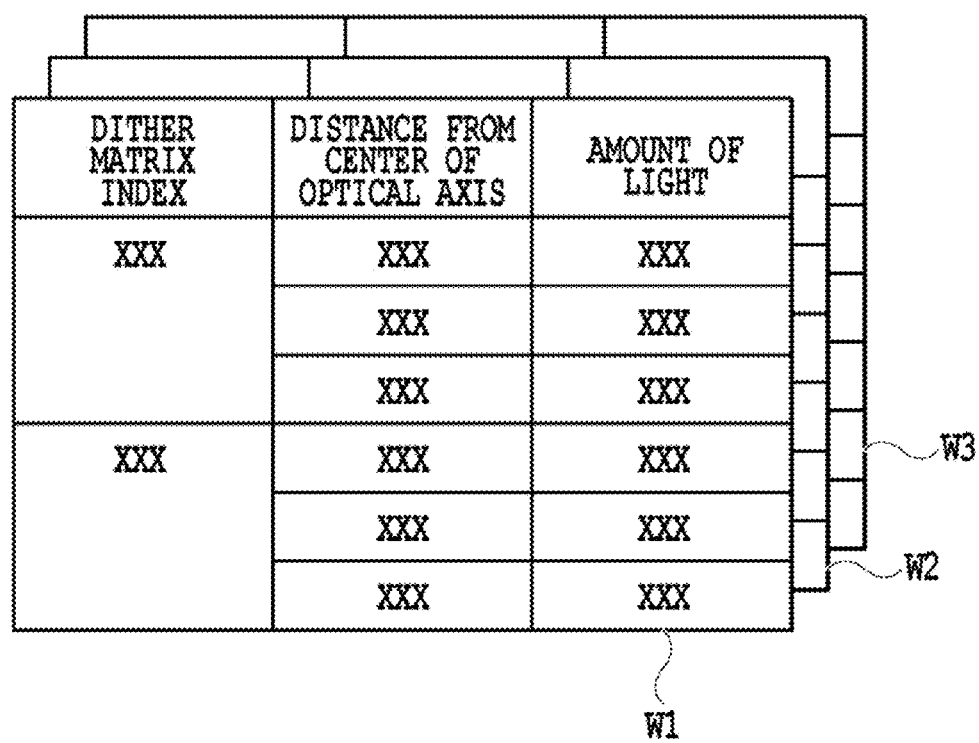
FIG. 12 is a schematic diagram of LUTs showing the correlations between dither matrices and light scattering characteristics according to Embodiment 3.

In Step S1104, the determination unit 304 calculates the spatial distribution of white ink based on the subsurface scattering characteristic data, which is obtained in Step S1102, and the amount of white ink, which is determined in Step S1103. FIG. 12 shows an example of the data held in the data hold unit 305 in this embodiment. As shown in FIG. 12, the data hold unit 305 holds a LUT for each amount of ink which indicates dither matrix indices and amounts of light scattering. Each LUT as shown in FIG. 12 is, too, data obtained by calculating the amount of light scattering via measurement of translucent bodies with the method shown in FIG. 5B or 5C, each translucent body being formed in advance by ejecting a predetermined amount of ink with a predetermined dither matrix. Each dither matrix index is a value that identifies a dither matrix to be used in a dither process, and dither matrices differing from each other in cycle are associated with different dither matrix indices. The determination unit 304 selects the LUT corresponding to the amount of white link, which is determined in Step S1103, and determines the dither matrix for the unit region to be processed by using the LUT. The dither matrix may be determined by selecting the LUT corresponding to the amount of white ink, which is determined in Step S1103, and selecting the distance from the center of the optical axis and the amount of light in the LUT that approximate the subsurface scattering characteristic obtained in Step S1101. For example, the determination unit 304 may select the index corresponding to the grid points in the LUT in FIG. 12 that have the least squares error with the subsurface scattering characteristic obtained in Step S1101.

In Step S1105, the image formation unit 306 forms an image on a transparent record medium (e.g. film) based on the amount of white ink, which is determined in Step S1103, and the spatial distribution of white ink, which is determined in Step S1104. By this step, the process ends. In Step S1105, the image formation unit 306 performs quantization by using a dither matrix having a frequency characteristic according to the spatial distribution of white ink, which is determined in Step S1104, with the amount of white ink, which is determined in Step S1103. A blue noise, a green noise, a white noise, or the like can be used as an example of the frequency pattern of the dither matrix. Then, the image formation unit 306 forms an image on the clear layer with white ink based on the quantized white ink data.

As described above, an image is formed based on the amount and spatial distribution of white ink corresponding to the subsurface scattering characteristic of the reproducing target. In this way, it is possible to form a print product with the shape of light scattering by the subsurface scattering controlled. Hence, it is possible to obtain a print product of any translucent body reproducing its appearance.

Embodiment 4

In Embodiments 1, 2, and 3, the description has been given of the examples that involve controlling the thickness of laminated clear ink (amount of clear ink), the amount of white ink, and the spatial distribution of white ink as methods of controlling the subsurface scattering characteristic. In this embodiment, description will be given of an example that involves combining control of the thickness of laminated clear ink, control of the amount of white ink, and control of the spatial distribution of white ink to more accurately control the subsurface scattering characteristic. Note that the configuration in Embodiment 4 is identical to Embodiments 1, 2, and 3. The difference from Embodiments 1, 2, and 3 is the determination unit 304. In the following, its configuration will be described, and description of the operation in the other processes will be omitted.

The determination unit 304 in this embodiment is configured to determine the amount of clear ink in relation to the amount of light scattering based on the subsurface scattering characteristic data on the reproducing target. Details of the method therefor are similar to those described in Embodiment 1. Also, the determination unit 304 is configured to determine the amount of white ink on the clear ink layer, which affects the gain in amount of light, based on the subsurface scattering characteristic data on the reproducing target. Details of the method therefor are similar to those described in Embodiment 2. Also, the determination unit 304 is configured to determine the spatial distribution of white ink in ejection thereof by the determined amount of white ink based on the subsurface scattering characteristic data on the reproducing target. Details of the method therefor are similar to those described in Embodiment 3.

As described above, in this embodiment, images are formed based on the thickness of laminated clear ink, the amount of white ink, and the spatial distribution of white ink corresponding to the subsurface scattering characteristic of the reproducing target. In this way, it is possible to form a print product with the shape of light scattering by the subsurface scattering controlled more accurately. Hence, it is possible to obtain a print product of any translucent body reproducing its appearance.

Embodiment 5

In Embodiments 1 to 4, the description has been given of the methods of controlling the subsurface scattering characteristic of a reproducing target based on its subsurface scattering characteristic data, by taking the examples where the subsurface scattering characteristic data is inputted through a UI as information on the reproducing target. In this embodiment, description will be given of an example that involves inputting both color data and the subsurface scattering characteristic data to reproduce the color and the subsurface scattering characteristic. As shown in FIG. 8 and other figures, a CMYK image layer is formed on the surface of the reproducing target. Depending on this CMYK image layer, the amount of light scattering may possibly decrease. In this embodiment, description will be given of an example where, to address the above case, the subsurface scattering characteristic is reproduced by referring also to the color data used for the formation of the CMYK image layer. Note that portions different from Embodiments 1 to 4 will be described, and description of the other portions will be omitted.

Figure 13:
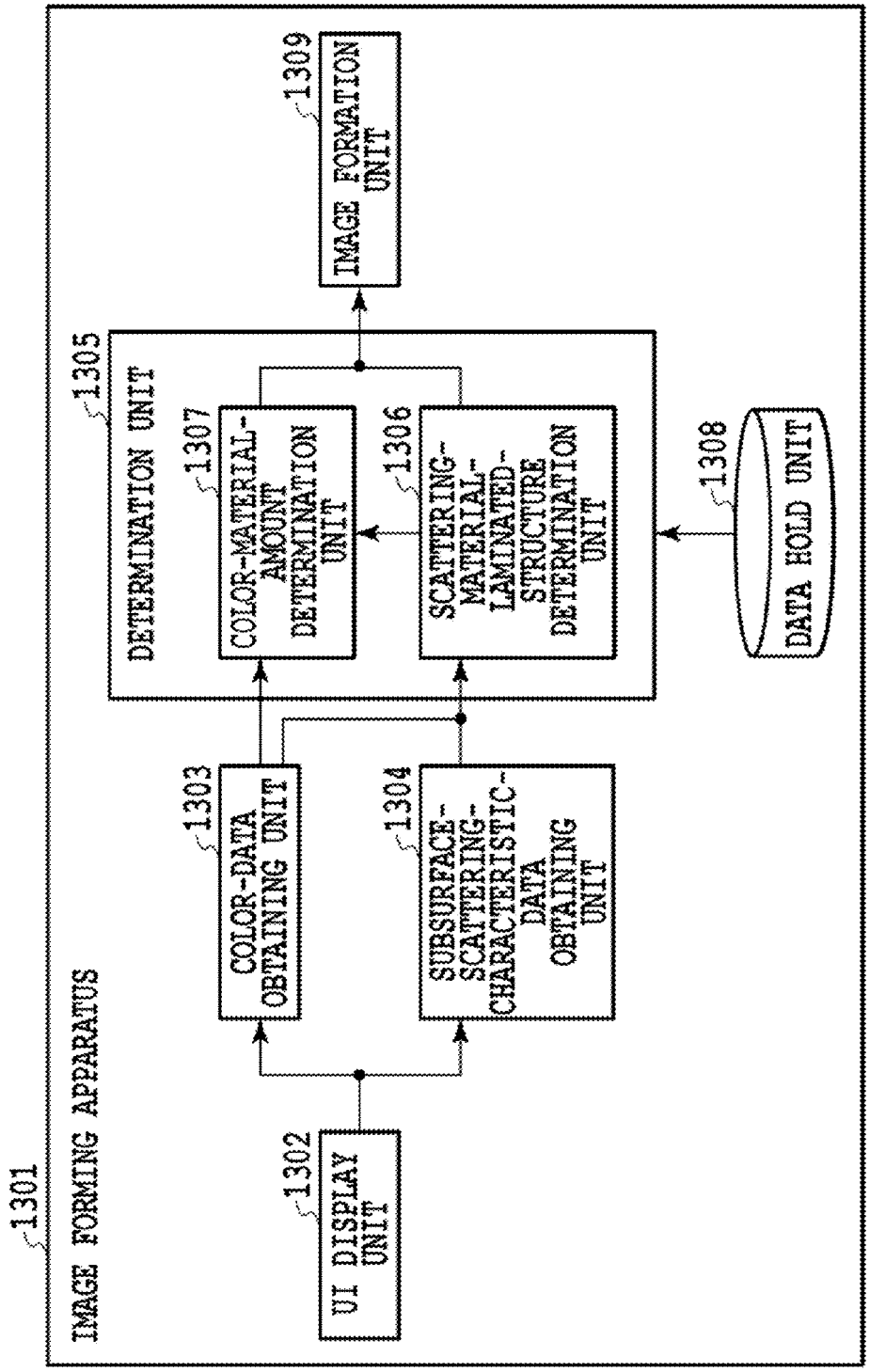
FIG. 13 is a block diagram showing the logical configuration of an image forming apparatus according to Embodiment 5.

FIG. 13 is a diagram showing the logical configuration of an image forming apparatus 1301 in this embodiment. In FIG. 13, the image forming apparatus 1301 includes a UI display unit 1302, a color-data obtaining unit 1303, a subsurface scattering characteristic-data obtaining unit 1304, a determination unit 1305, a data hold unit 1308, and an image formation unit 1309. The determination unit 1305 includes a scattering-material-laminated-structure determination unit 1306 and a color-material-amount determination unit 1307.

The UI display unit 1302 is configured to display a user interface and the like on a monitor 205 and receive color data and subsurface scattering characteristic data from the user. The color-data obtaining unit 1303 is configured to obtain the color data on the reproducing target designated by the user. The subsurface-scattering-characteristic-data obtaining unit 1304 is configured to obtain the subsurface scattering characteristic data designated by the user. The determination unit 1305 is configured to determine the amounts of color materials and the laminated structure of each scattering material for reproducing the reproducing target from the obtained color data and subsurface scattering characteristic data.

The scattering-material-laminated-structure determination unit 1306 of the determination unit 1305 is configured to determine the laminated structure of each scattering material from the obtained color data and subsurface scattering characteristic data. The color-material-amount determination unit 1307 is configured to determine the amounts of the color materials based on the laminated structure of one of the scattering materials, which is determined by the scattering-material-laminated-structure determination unit 1306, and the color data. The data hold unit 1308 is configured to hold color material characteristics, subsurface scattering characteristics related to the laminated structure of each scattering material, and the like. The image formation unit 208 is configured to form images based on the determined amounts of the color materials and laminated structure of each scattering material. Note that the laminated structure of each scattering material refers to the number of laminations of the scattering material or the amount of the scattering material and the spatial distribution of the scattering material, as mentioned earlier.

Figure 14:
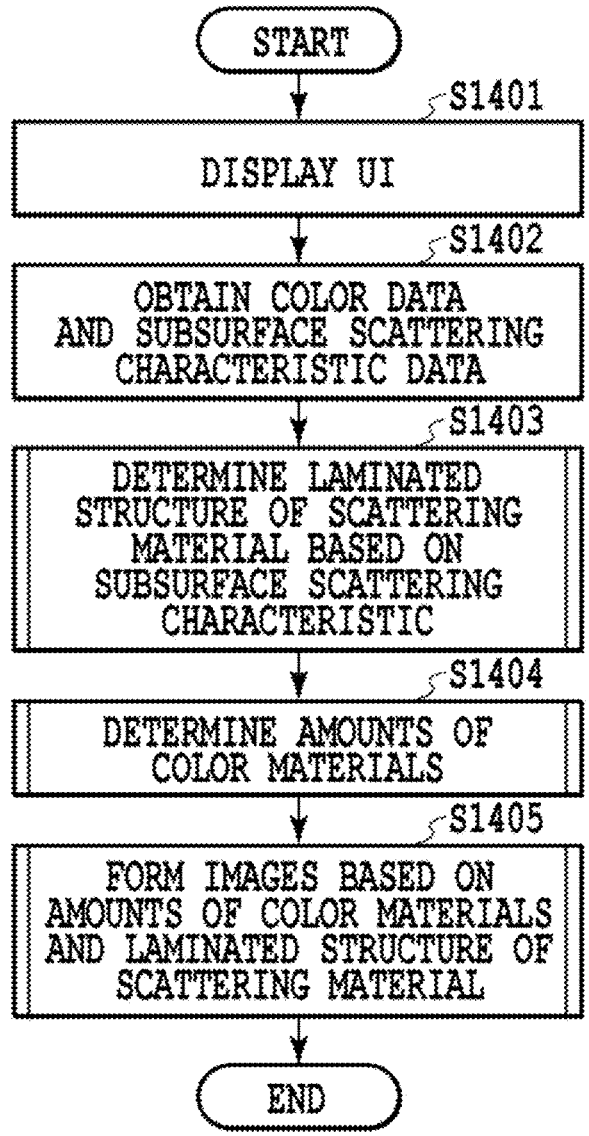
FIG. 14 is a flowchart of an image forming process according to Embodiment 5.

FIG. 14 is a flowchart of a process performed by the image forming apparatus 1301. In Step S1401, the UI display unit 1302 displays the user interface for the user to input necessary information for performing image processing.

In Step S1402, the color-data obtaining unit 1303 and the subsurface-scattering-characteristic-data obtaining unit 1304 obtain the color data and the subsurface scattering characteristic data on the reproducing target designated by the user.

In Step S1403, the scattering-material-laminated-structure determination unit 1306 performs gain operation on the amount of light by using the color data, which is obtained in Step S1402. Specifically, the scattering-material-laminated-structure determination unit 1306 performs gain operation on the amount of light indicated by the subsurface scattering characteristic data, which is obtained in Step S1402, by using the color data, which is obtained in Step S1402. Based on the subsurface scattering characteristic data subjected to the gain operation on the amount of light, the scattering-material-laminated-structure determination unit 1306 determines the laminated structure of each scattering material.

In Step S1404, the color-material-amount determination unit 1307 obtains a color reproduction characteristic corresponding to the amount of one of the scattering materials, which is a component of the laminated structure of the scattering material calculated in Step S1403, and determines the amounts of the color materials for the print product corresponding to the color data, which is obtained in Step S1402. The specific process by the color-material-amount determination unit 1307 will be described later.

In Step S1405, the image formation unit 1309 forms images on a transparent record medium (e.g. film) based on the laminated structure of the scattering material, which is determined in Step S1403, and the amounts of the color materials, which are determined in Step S1404. By this step, the process ends. The specific process by the image formation unit 1309 will be described later.

Figure 15:
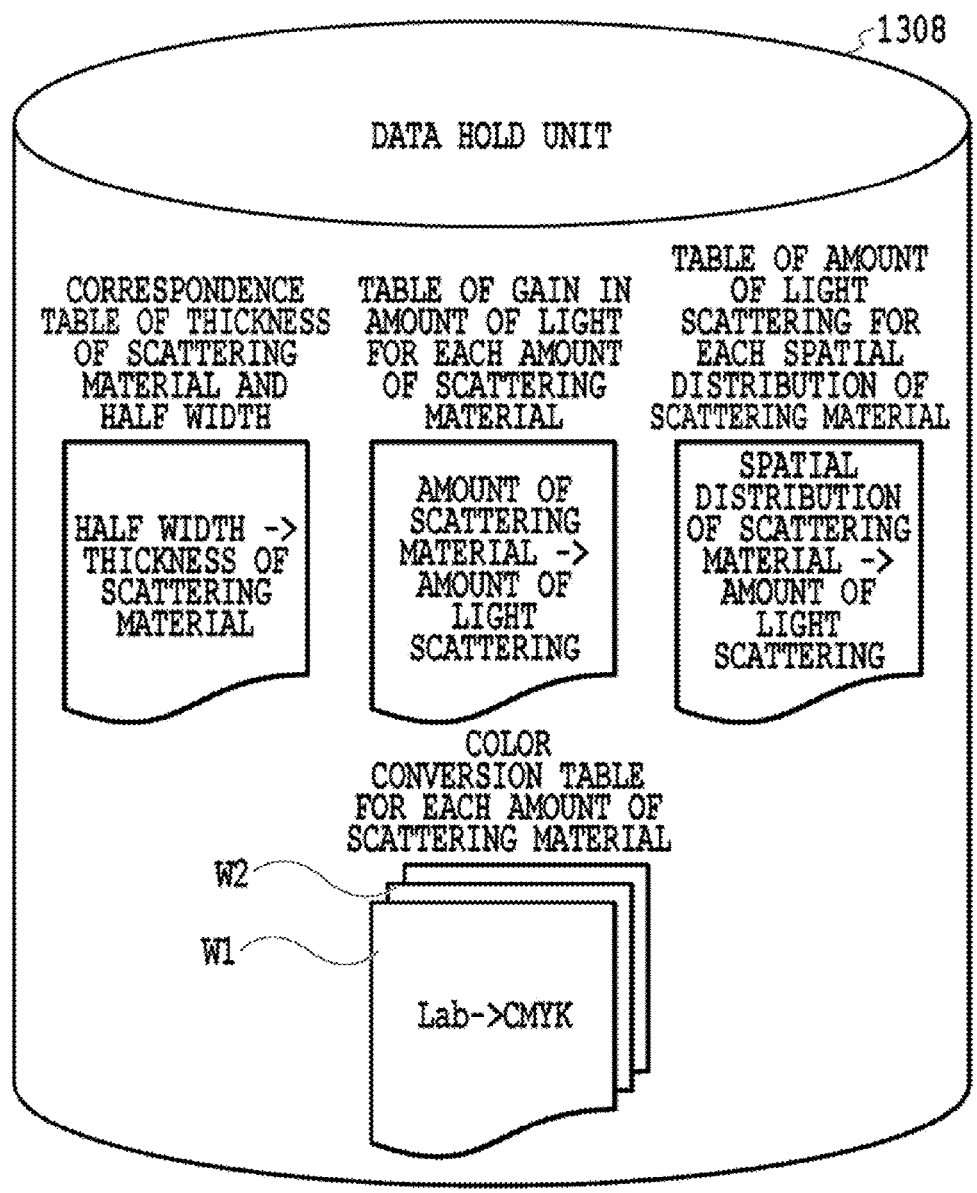
FIG. 15 is a schematic diagram showing the internal configuration of a data hold unit according to Embodiment 5.

FIG. 15 is a diagram showing an example of the data held in the data hold unit 1308 in this embodiment. As shown in FIG. 15, the data hold unit 1308 holds a correspondence table of amounts of clear ink (thicknesses of the clear layer) and half widths in amount of light. This correspondence table is similar to the table described in Embodiment 1. Also, the data hold unit 1308 holds a light-scattering amount table for each amount of the scattering material. This table is similar to the table described in Embodiment 2. Also, the data hold unit 1308 holds a light-scattering amount table for each spatial distribution of the scattering material. This table is similar to the table described in Embodiment 3. Also, the data hold unit 1308 holds a color conversion table for each amount of the scattering material.

As mentioned earlier, the larger the thickness of the clear layer, the larger the distance of light scattering from the center of the optical axis, whereas the smaller the thickness of the clear layer, the smaller the distance of light scattering. Also, the larger the amount of the scattering material, the smaller the amount of light scattering and hence the clearer a projected image of light, whereas the smaller the amount of the scattering material, the larger the amount of light scattering and hence the more blurred a projected image of light. Also, the reflection characteristic changes with the amount of the scattering material, and hence the necessary color materials for reproducing the colors of the reproducing target change accordingly. The data hold unit 1308 holds data obtained by forming print products with the amount of the scattering material varied by means of the image formation unit 1309 and measuring the print products with the method shown in FIG. 5B or 5C. Specifically, the data hold unit 1308 holds a correspondence table of thicknesses of the clear layer and half widths, a correspondence table of amounts of the scattering material and gains in amount of light, a correspondence table of spatial distributions of the scattering material and amounts of light scattering, and a color conversion table for each amount of the scattering material, all of which are created in advance.

Figure 16:
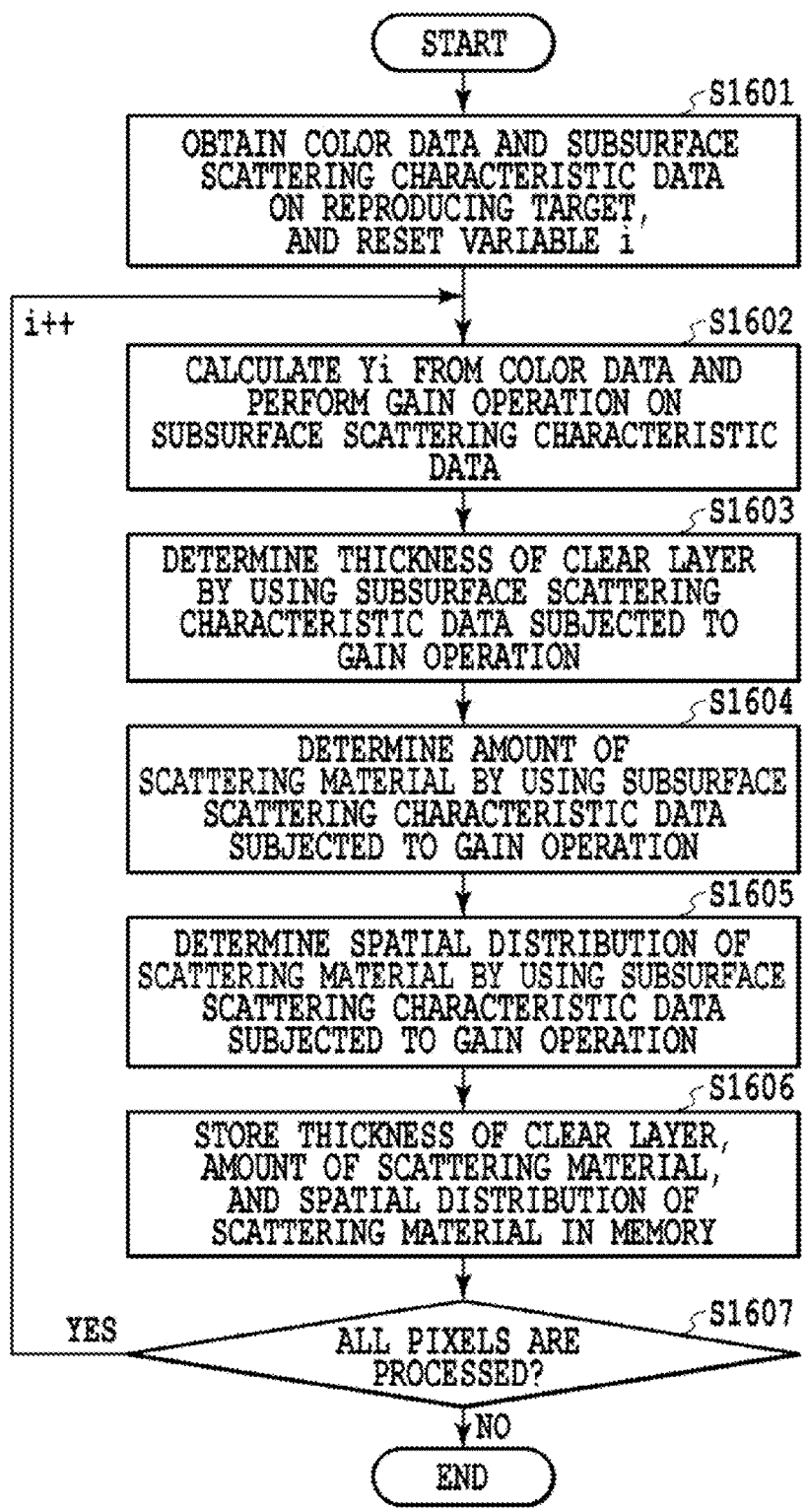
FIG. 16 is a flowchart of a scattering-material-laminated-structure determining process according to Embodiment 5.

FIG. 16 is a flowchart of the process performed by the scattering-material-laminated-structure determination unit 1306 in Step S1403.

In Step S1601, the scattering-material-laminated-structure determination unit 1306 obtains the color data on the reproducing target and the subsurface scattering characteristic data on the reproducing target. Moreover, the scattering-material-laminated-structure determination unit 1306 sets a variable i indicating a pixel number to 0. In this embodiment, a unit region to be processed is a pixel.

In Step S1602, the scattering-material-laminated-structure determination unit 1306 calculates a luminance value Yi from the color values at the pixel i by using Equation 1. Here, the color data is 8-bit RGB data, and the R, G, and B values for the pixel number i are $R_i$, $G_i$, and $B_i$, respectively, and $\alpha$, $\rho$, and $\gamma$ are constants.

$$Y_i = \alpha \times \frac{R_i}{255} + \beta \times \frac{G_i}{255} + \gamma \times \frac{B_i}{255} \qquad \text{Equation 1}$$

Then, in Step S1602, the scattering-material-laminated-structure determination unit 1306 performs gain operation on the amount of light in the subsurface scattering characteristic data, which is obtained in Step S1601, by using Equation 2. Here, $Y_{ij}$ is the luminance value at a distance j from the center of the optical axis at the pixel i, and $Y_{ij}'$ is the luminance value after the gain operation.

$$Y_{ij}' = \frac{(\alpha + \beta + \gamma) \times Y_{ij}}{Y_i} \qquad \text{Equation 2}$$

Specifically, the amount of light scattering may possibly decrease also due to the CMYK image layer, as mentioned earlier. To address this, the subsurface scattering characteristic data is corrected based on the color data so that a subsurface scattering characteristic as described in Embodiments 1 to 4 can be reproduced with the gain in amount of light taken into consideration.

In Step S1603, the scattering-material-laminated-structure determination unit 1306 determines the amount of clear ink (the thickness of the clear layer) by using the subsurface scattering characteristic data subjected to the gain operation in Step S1602. In Step S1604, the scattering-material-laminated-structure determination unit 1306 determines the amount of white ink (the amount of the scattering material) by using the subsurface scattering characteristic data subjected to the gain operation in Step S1602. In Step S1605, the scattering-material-laminated-structure determination unit 1306 determines the spatial distribution of the scattering material by using the subsurface scattering characteristic data subjected to the gain operation in Step S1602. In Step S1606, the scattering-material-laminated-structure determination unit 1306 stores the thickness of the clear layer, the amount of the scattering material, and the spatial distribution of the scattering material in a memory. Steps S1603 to S1606 are similar to the processes described in the foregoing embodiments except that the process target data is the subsurface scattering characteristic data subjected to the gain operation.

In Step S1607, the scattering-material-laminated-structure determination unit 1306 determines whether or not all the pixels have been processed. If so, the scattering-material-laminated-structure determination unit 1306 ends the process and, if not, adds 1 to the pixel number and jumps to Step S1601.

<Operation of Color-Material-Amount Determination Unit 1307 in Step S1404>

Figure 17:
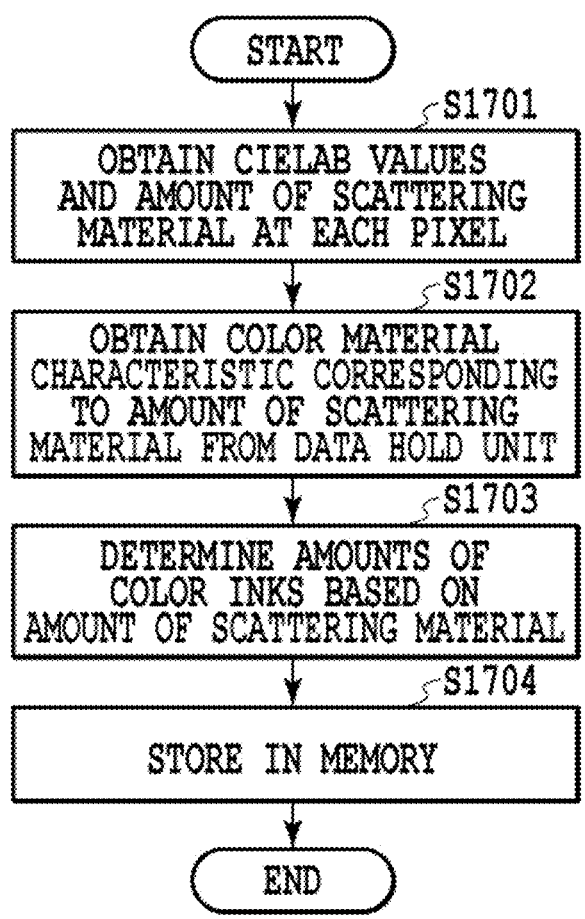
FIG. 17 is a flowchart of calculation of the amounts of color materials according to Embodiment 5.

FIG. 17 is a flowchart of the process performed by the color-material-amount determination unit 1307 in Step S1404. In Step S1701, the color-material-amount determination unit 1307 obtains the CIELAB values at each pixel of the image indicated by the color data on the reproducing target, and the amount of the scattering material (the amount of white ink) at each pixel, which is calculated in Step S1403.

In Step S1702, the color-material-amount determination unit 1307 obtains the color material characteristic corresponding to the amount of the scattering material from the data hold unit 1308. For example, the data hold unit 1308 holds a color conversion table for each amount of white ink. The image formation unit 1309 includes color inks for controlling colors, in addition to white ink for controlling scattering. The color inks in this embodiment are of four colors of cyan (C), magenta (M), yellow (Y), and black (K), and the scattering characteristics such as transmittance and reflection of these inks are negligibly small. The correlations between combinations of amounts of these color inks and CIELAB values are defined in advance in a color conversion table for each amount of white ink and stored in the data hold unit 1308. For example, for each amount of white ink, the correlations between grid points created by dividing a range allowed for CIELAB values (e.g. 0≤L*≤255, −128≤a*, b*≤127) into 17 slices for each axis, and the amounts of the CMYK inks for reproducing the grid points are defined in advance. Here, in a case where the CIELAB values at any grid point are outside the gamut which the image formation unit 1309 can reproduce, a process is performed that involves shifting the CIELAB values within the gamut by performing gamut compression (gamut mapping) as appropriate. The CIELAB values may be set as values assuming either reflection or transmission, but need to be consistent with the CIELAB values obtained in Step S1701. In this embodiment, the data hold unit 1308 holds color conversion tables of CIELAB values and amounts of color inks, as shown in FIG. 18. Note that any method can be used as the method of creating the color conversion tables. Description of the method is omitted in this embodiment since there are many known methods.

In Step S1703, the color-material-amount determination unit 1307 refers to the color conversion table corresponding to the amount of white ink for each pixel, and calculates the amounts of color inks for reproducing the reflective CIELAB values at the pixel. The amounts of color inks may be calculated by performing interpolation operation with the color conversion table. As the method of the interpolation, a known method such for example as tetrahedral interpolation or cubic interpolation may be used.

In Step S1704, the color-material-amount determination unit 1307 stores the calculated amount of white ink and amounts of color inks at each pixel into a memory and ends the process.

Figure 19:
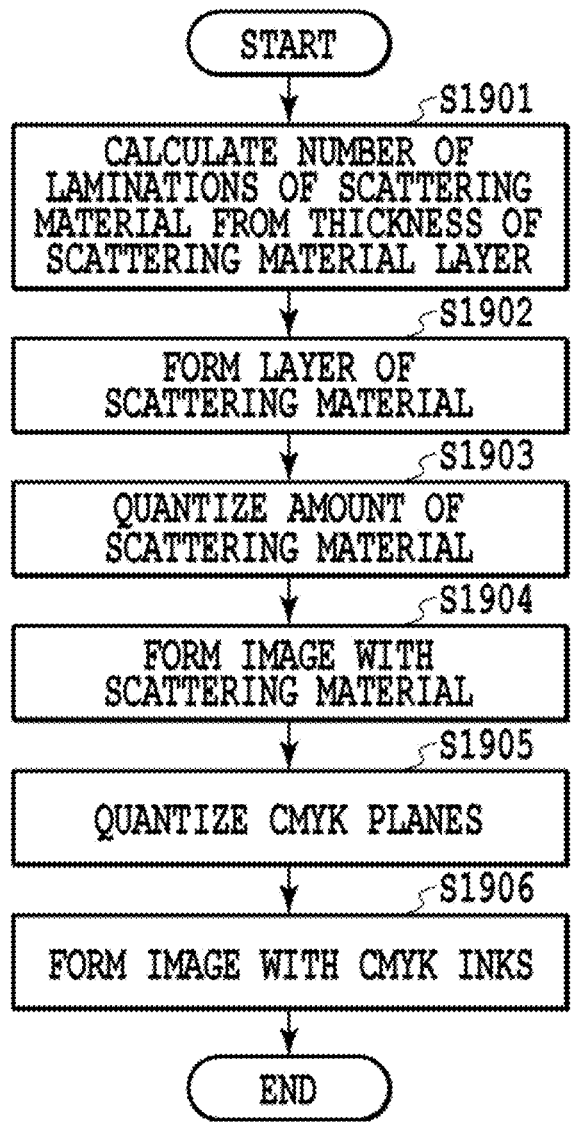
FIG. 19 is a flowchart of an image forming process according to Embodiment 5.

FIG. 19 is a flowchart of the process performed by the image formation unit 1309 in Step S1405. In Step S1901, the image formation unit 1309 calculates the number of laminations of clear ink from the thickness of the clear layer, which is calculated in Step S1403. A possible method of the calculation may be using a table in which the correlation between the thickness of the clear layer and the number of laminations is recorded. Alternatively, the calculation can be done by multiplying the thickness of the clear layer by a predetermined coefficient since the number of laminations and the thickness are usually in proportion to each other.

In Step S1902, the image formation unit 1309 forms the clear layer on the record medium based on the number of laminations calculated in Step S1901. To form a layer of a desired thickness, the image formation unit 1309 in this embodiment laminates clear ink a plurality of times by repeating scan by a carriage.

In Step S1903, the image formation unit 1309 quantizes the amounts of white ink, which are calculated in Step S1403. In the quantization, the amounts of white ink inputted are handled as pieces of information spatially distributed evenly over the inputted image size, in other words, image data containing amounts of white ink inputted respectively to the pixels. The method of the quantization may be a general method such as a dither matrix method or an error diffusion method.

In Step S1904, the image formation unit 1309 forms an image on the clear layer with white ink based on the quantized white ink data.

In Step S1905, the image formation unit 1309 quantizes the amounts of CMYK inks, which are calculated in Step S1404, on a color-by-color basis.

In Step S1906, the image formation unit 1309 forms an image on the white ink image, which is formed on the clear layer, by using the color inks based on the quantized CMYK ink data.

The above process from Steps S1901 to S1906 is repeated at each paper feed operation until the formation of the whole area of the inputted image is completed.

Note that although Step S1404 has been described under the assumption that the inputted image and the image formation unit have the same resolution, a resolution conversion process may be performed as appropriate if they have different resolutions. Also, a clear layer, a white ink image, and a CMYK image are all formed at each paper feed, but the formation is not limited to this method. For example, it is possible to firstly form a clear layer over the entire area of the inputted image and return the record medium to a predetermined record start position, and then form a white ink image, return the record medium again to the predetermined record start position, and form a CMYK image.

As described above, the subsurface scattering characteristic of the reproducing target is reproduced by also taking into consideration the gain in amount of light based on the color data on the reproducing target. In this way, it is possible to obtain a print product of any translucent body accurately reproducing its appearance.

Embodiment 6

In Embodiments 1 to 5, the description has been given of the examples that involve inputting the amount of light corresponding to the distance from the center of the optical axis as the subsurface scattering information on the reproducing target. In this embodiment, description will be given of an example that involves inputting a characteristic parameter of subsurface scattering (e.g. haze value) from the user, referring to a database for the amount of light scattering corresponding to the parameter, and outputting the amount of light scattering as the subsurface scattering information on the reproducing target.

Figure 20:
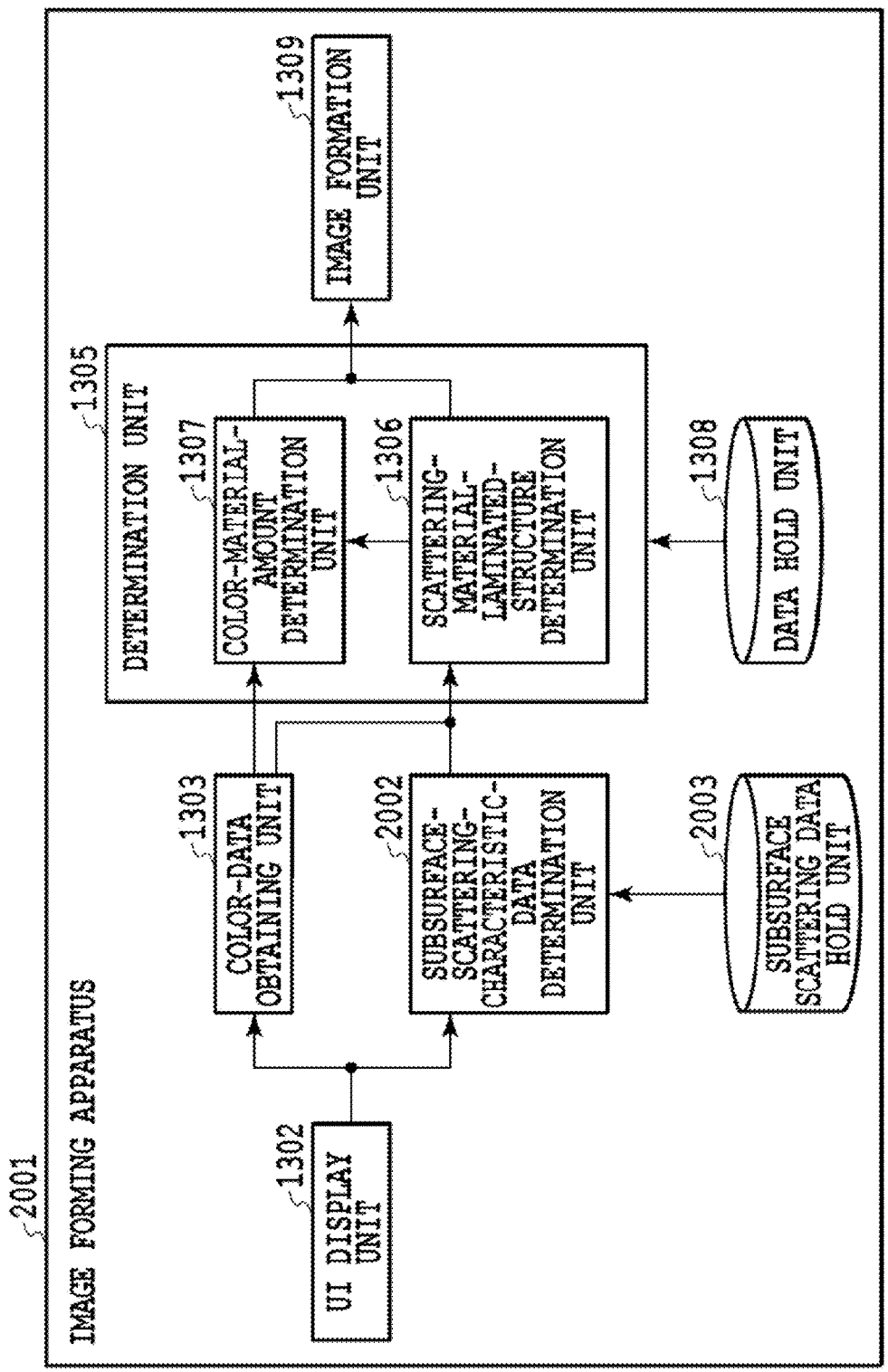
FIG. 20 is a block diagram showing the logical configuration of an image forming apparatus according to Embodiment 6.

FIG. 20 is a diagram showing the logical configuration of an image forming apparatus 2001 in this embodiment. In FIG. 20, the image forming apparatus 2001 includes the units of the image forming apparatus 1301, which is described in Embodiment 5, with the subsurface scattering characteristic-data obtaining unit 1304 replaced with a subsurface scattering characteristic data determination unit 2002, and further includes an subsurface-scattering-data hold unit 2003. Besides these points, the image forming apparatus 2001 is similar to the image forming apparatus 1301, which is described in Embodiment 5.

FIG. 21 is a diagram showing an example of data held in the subsurface-scattering-data hold unit 2003. As shown in FIG. 21, the subsurface-scattering-data hold unit 2003 holds a LUT indicating haze values as an subsurface scattering parameter and amounts of light scattering (distances from the optical axis and amounts of light) corresponding to the haze values.

In this embodiment, for example, the user inputs the subsurface scattering parameter such as a haze value, and the subsurface scattering characteristic data determination unit 2002 determines the subsurface scattering characteristic data by referring to the data held in the subsurface-scattering-data hold unit 2003.

The subsequent processes are similar to those described in Embodiment 5.

As described above, in this embodiment, the spatial distribution of a scattering material is determined from a physical parameter as subsurface scattering information other than light scattering amount information corresponding to the distance from the center of the optical axis. In this way, it is possible to easily obtain a print product of any translucent body reproducing its appearance even without using detailed data such as the light scattering amount information corresponding to the distance from the center of the optical axis.

Other Embodiments

Note that although this embodiment has been described by taking the example where the spatial distribution of the scattering material is a two-dimensional distribution of the scattering material, it is needless to say that the scattering material may be arranged three-dimensionally. For example, in this embodiment, the example where white ink is printed over clear ink has been described, but it is needless to say that a clear ink layer, a white ink layer, and a clear ink layer may printed three-dimensionally in this order. Moreover, it is needless to say that the spatial distribution of the scattering material may be such that the scattering material is distributed three-dimensionally instead of being distributed on a single plane.

Also, although a single-dot area is used for the scattering material in the above example, it is needless to say that the dot size may be changed and a plurality of dot sizes such as large, middle, and small dot sizes may be used as long as the density of the scattering material can be expressed.

Also, in this embodiment, the description has been given of the method in which the amount of light scattering is obtained using a parameter representing subsurface scattering and a database in a case of not directly using the amount of light scattering. However, it is needless to say that this parameter only needs to be such that the correlation between the parameter and amounts of light scattering is uniquely defined, and a different type of parameter may therefore be used. For example, the correlation may be between a type of material such as wood, plastic, cloth, human skin, or leather and light scattering. Further, in the case where the material is human skin, different amounts of light scattering may be held for different ages.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to reproduce such an appearance as subsurface scattering in the translucent body appropriately.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-064473, filed Mar. 26, 2015, which is hereby incorporated by reference wherein in its entirety.

What is claimed is:

1. An image forming apparatus that forms a layer of at least one type of printing material by recording the printing material on a recoding medium, the image forming apparatus comprising:
one or more processors; and
a memory storing a program which, when executed by the one or more processors, causes the image forming apparatus to:
obtain subsurface scattering characteristic data indicating an intensity of exiting light from a reproducing target according to a distance from a position of incidence of light into the reproducing target;
determine a recording amount of the printing material used for forming the layer of the printing material on the recording medium based on the subsurface scattering characteristic data; and
form an image corresponding to the layer of the printing material on the recording medium based on the determined recording amount.

2. The image forming apparatus according to claim 1, wherein
the image forming apparatus forms layers of at least two types of printing materials differing from each other in transmittance, and
the one or more processors cause the image forming apparatus to:
determine a recording amount of a first printing material of the at least two types of printing materials used for forming a layer of the first printing material on the recording medium from the subsurface scattering characteristic data, the first printing material having higher transmittance than that of another printing material; and
determine a recording amount of a second printing material of the at least two types of printing materials used for forming a layer of the second printing material on the layer of the first printing material from the subsurface scattering characteristic data, the second printing material having a lower transmittance than the other printing material; and
form images corresponding to the layers of the printing materials on the recording medium based on the determined recording amounts.

3. The image forming apparatus according to claim 2, wherein
the one or more processors cause the image forming apparatus to:
determine a spatial distribution of the second printing material from the subsurface scattering characteristic data, and
form an image corresponding to the recording amount of the second printing material in accordance with the spatial distribution.

4. The image forming apparatus according to claim 2, wherein the one or more processors cause the image forming apparatus to form a transparent reflective layer on the recording medium and form the layer of the first printing material on the reflective layer.

5. The image forming apparatus according to claim 2, wherein
the first printing material is a clear ink, and
the second printing material is a white ink.

6. The image forming apparatus according to claim 1, wherein
the image forming apparatus forms a layer of a plurality of color materials on the layer of the printing material, and
the one or more processors cause the image forming apparatus to:
obtain color data on the reproducing target, and
correct the subsurface scattering characteristic data based on the color data, and determine the recording amount of the printing material by using the corrected subsurface scattering characteristic data.

7. The image forming apparatus according to claim 1, wherein the one or more processors cause the image forming apparatus to switch between a plurality of dither matrices differing from each other in frequency characteristic in accordance with the determined recording amount of the printing material.

8. The image forming apparatus according to claim 1, wherein the one or more processors cause the image forming apparatus to change a dot size in accordance with the determined recording amount of the printing material.

9. The image forming apparatus according to claim 1, wherein the subsurface scattering characteristic data is the data allocated per unit of the reproducing target to be processed.

10. The image forming apparatus according to claim 1, wherein the subsurface scattering characteristic data is data obtained by referring to a memory holding the subsurface scattering characteristic data, based on a parameter inputted by a user.

11. The image forming apparatus according to claim 10, wherein the parameter is a haze value.

12. The image forming apparatus according to claim 10, wherein
the memory holds data indicating correlations between types of materials and amounts of light scattering, and
the parameter represents a type of material.

13. The image forming apparatus according to claim 1, wherein the one or more processors cause the image forming apparatus to:
determine a thickness the layer of the printing material based on the subsurface scattering characteristic data; and
form the image based on the determined thickness.

14. The image forming apparatus according to claim 13, further comprising:
a memory holding information indicating a subsurface scattering characteristic of the layer of the printing material according to the thickness of the layer of the printing material in a case of forming the layer of the printing material on the recording medium; and
the one or more processors cause the image forming apparatus to form the image further based on the information.

15. The image forming apparatus according to claim 1, wherein the printing material is an ink transmitting light.

16. The image forming apparatus according to claim 15, wherein the printing material is a clear ink.

17. The image forming apparatus according to claim 1, wherein the reproducing target is a translucent body.

18. The image forming apparatus according to claim 1, further comprising:
a memory holding information indicating subsurface scattering characteristic of the printing material according to the recording amount of the printing material in case of recording the printing material on the recording medium; and the one or more processors causes the image forming apparatus to form the image further based on the information.

19. An image forming method for forming a layer of at least one type of printing material by recording the printing material on the recording medium, the method comprising:
- an obtaining step of obtaining subsurface scattering characteristic data indicating an intensity of exiting light from a reproducing target according to a distance from a position of incidence of light into the reproducing target;
- a determination step of determining a recording amount of the printing material used for forming the layer of the printing material on the recording medium based on the subsurface scattering characteristic data; and
- a formation step of forming an image corresponding to the layer of the printing material on the recording medium based on the determined recording amount.

20. A non-transitory computer readable storage medium storing a program which causes a computer to perform an image forming method for forming a layer of at least one type of printing material by recording the printing material on a recording medium, the method comprising:
- an obtaining step of obtaining subsurface scattering characteristic data indicating an intensity of exiting light from a reproducing target according to a distance from a position of incidence of light into the reproducing target;
- a determination step of determining a recording amount of the printing material used for forming the layer of the printing material on the recording medium based on the subsurface scattering characteristic data; and
- a formation step of forming an image corresponding to the layer of the printing material on the recording medium based on the determined recording amount.

* * * * *